(12) United States Patent
Weigand

(10) Patent No.: US 10,093,126 B2
(45) Date of Patent: Oct. 9, 2018

(54) WHEEL HUB ARRANGEMENT

(71) Applicant: SAF-HOLLAND GmbH, Bessenbach (DE)

(72) Inventor: Werner Weigand, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 8 days.

(21) Appl. No.: 15/303,969

(22) PCT Filed: Mar. 31, 2015

(86) PCT No.: PCT/EP2015/057092
§ 371 (c)(1),
(2) Date: Oct. 13, 2016

(87) PCT Pub. No.: WO2015/158547
PCT Pub. Date: Oct. 22, 2015

(65) Prior Publication Data
US 2017/0036481 A1 Feb. 9, 2017

(30) Foreign Application Priority Data
Apr. 15, 2014 (DE) .......... 10 2014 207 179

(51) Int. Cl.
*B60B 7/06* (2006.01)
*B60B 7/00* (2006.01)
*B60B 7/08* (2006.01)
*B60B 27/00* (2006.01)

(52) U.S. Cl.
CPC .......... *B60B 7/066* (2013.01); *B60B 7/0013* (2013.01); *B60B 7/08* (2013.01); *B60B 27/0073* (2013.01); *B60B 27/00* (2013.01); *B60B 2900/211* (2013.01); *B60B 2900/5112* (2013.01); *B60B 2900/5114* (2013.01); *B60Y 2200/10* (2013.01); *B60Y 2200/14* (2013.01)

(58) Field of Classification Search
CPC ....... B60B 7/0013; B60B 7/002; B60B 7/066; B60B 7/08; B60B 27/0073
USPC .......... 301/108.1, 108.2, 108.3, 108.4, 108.5
See application file for complete search history.

(56) References Cited

U.S. PATENT DOCUMENTS

| 1,766,313 A | 6/1930 | Stokes |
| 3,089,738 A * | 5/1963 | Steiner .................. B60B 7/0013 |
| | | 301/108.2 |
| 3,393,015 A | 7/1968 | Kaufman |

(Continued)

FOREIGN PATENT DOCUMENTS

| DE | 93 07 931 | 9/1993 |
| EP | 18 20 985 | 8/2007 |

(Continued)

OTHER PUBLICATIONS

European Patent Office, International Search Report;, dated Jun. 23, 2015.

*Primary Examiner* — Kip T Kotter
(74) *Attorney, Agent, or Firm* — Price Heneveld LLP

(57) ABSTRACT

The present invention relates to a wheel cover and to a wheel hub arrangement, wherein the wheel cover has a shielding section, which shields a gap formed between a hub and the wheel cover, and wherein a wheel hub arrangement is provided, in which a seal element is arranged in a gap formed between a wheel cover and the hub, which seal element is embodied as a profile seal.

22 Claims, 3 Drawing Sheets

(56) References Cited

U.S. PATENT DOCUMENTS

| | | | |
|---|---|---|---|
| 3,887,046 A * | 6/1975 | Bueler | B60T 8/329 |
| | | | 188/181 A |
| 4,489,988 A | 12/1984 | Robbins | |
| 5,217,137 A | 6/1993 | Andrews | |
| 6,758,531 B1 * | 7/2004 | Bullard | B60B 3/16 |
| | | | 301/108.4 |
| 8,104,970 B2 | 1/2012 | Kazuo | |
| 9,328,770 B2 * | 5/2016 | Ishida | F16C 33/726 |
| 2006/0082214 A1 * | 4/2006 | Dombroski | B60B 7/0013 |
| | | | 301/108.1 |
| 2007/0052284 A1 * | 3/2007 | White | B60B 7/0013 |
| | | | 301/108.1 |
| 2014/0175861 A1 * | 6/2014 | White | F16J 15/32 |
| | | | 301/108.1 |
| 2015/0239286 A1 * | 8/2015 | Boswell-Horstmeyer | |
| | | | B60B 7/0053 |
| | | | 301/37.26 |

FOREIGN PATENT DOCUMENTS

| | | | |
|---|---|---|---|
| JP | 08058301 A * | 3/1996 | |
| JP | 2007309389 | 11/2007 | |
| JP | 2008196553 | 8/2008 | |
| JP | 2012036960 | 2/2012 | |

\* cited by examiner

WHEEL HUB ARRANGEMENT

BACKGROUND OF THE INVENTION

This invention relates to a wheel hub arrangement, in particular for use in commercial vehicles.

Wheel hub arrangements having wheel covers for covering various regions on a vehicle wheel or on the wheel hub of a vehicle are known from the prior art. They protect the internal regions of the wheel and/or of the wheel hub against the penetration of dirt and moisture and from damage resulting therefrom. To support the sealing action of the wheel cover, it is likewise a known practice from the prior art to arrange sealing rings, e.g. rubber seals, between the wheel hub and the wheel cover, said sealing rings improving the sealing effect of the wheel cover. However, the solutions known from the prior art have deficiencies since the seals known from the prior art often fail to achieve an adequate sealing effect particularly when liquid strikes the region between the wheel cover and the wheel hub at high speed. Thus, it has been found that water or other liquids can repeatedly get into the interior of the hub, particularly when driving at high speed in rain or, for example, when cleaning the wheels with a high-pressure cleaner while the commercial vehicle is stationary.

It is the object of the present invention to improve the protective effect of a wheel cover in such a way that even liquids or dirt particles impinging at high speed can be kept away in an effective manner from the interior of the wheel hub.

SUMMARY OF THE INVENTION

According to the invention, a wheel hub arrangement is provided, which comprises a hub and a wheel cover, wherein the wheel cover can be fixed in a recess in the hub in such a way that the wheel cover delimits an outer region with respect to an inner region of the hub, wherein a seal element is arranged between the hub and the wheel cover, wherein either the seal element has a main body and a sealing lip, wherein the sealing lip projects from the main body and faces the outer region or, alternatively or in addition, the wheel cover has a shielding section, wherein the shielding section shields the gap between the hub and the wheel cover and/or the seal element arranged in the gap in at least one shielding direction. Two preferred possibilities are provided within the scope of the present invention in order to protect the inner region of the hub from penetration of liquids and/or foreign bodies: the wheel hub arrangement has either a specially shaped seal element and/or the wheel cover has a shielding section. The seal profile is designed in such a way that it produces even prior shielding an optimum sealing effect if liquid or dirt particles impinge directly on the seal profile. For this purpose, the seal profile is preferably embodied as a profile seal, wherein a main body and a sealing lip are provided, wherein the sealing lip projects from the main body in such a way that a liquid or dirt particle flow impinging on the sealing lip from the outer region produces a force component on the sealing lip which presses the sealing lip more strongly against the hub or the wheel cover, wherein the sealing effect achieved by the seal element is increased in this way. For this purpose, the sealing lip faces the outer region. This means, in particular, that the sealing lip projects in a direction from the inner region to the outer region within the gap. In other words, the foot of the sealing lip is closer to the inner region than the distal end of the sealing lip, which, in turn, is closer to the outer region than the foot of the sealing lip. The seal element is particularly preferably embodied as a lamellar seal, which is designed to seal bodies that do not move relative to one another. For this purpose, the contact surfaces of the seal element, which each rest on the hub or the wheel cover, have extended-area surfaces, preferably with enhanced adhesion. As an alternative or in addition to the seal element embodied as a profile seal, the wheel cover has an engagement section and a shielding section, wherein the engagement section can be fixed in the recess in a hub in such a way that the wheel cover delimits an outer region with respect to an inner region of the hub, wherein a gap is formed between the hub and the wheel cover, wherein the shielding section shields the gap between the hub and the wheel cover and/or a seal element arranged in the gap in at least one shielding direction. The two essential parts of the wheel cover are the engagement section and the shielding section, wherein it is advantageous to design the engagement section to be brought into positive engagement with a corresponding engagement geometry of a hub. The shielding section is designed in such a way that it represents a barrier to block the path into the interior of the hub. In other words, the wheel cover forms a cap, which can be placed on a recess in a hub of a commercial vehicle and can be fixed thereon. Owing to manufacturing tolerances, it is generally unavoidable that there remains a gap between the wheel cover and the hub, wherein a seal element can advantageously be inserted in this gap to further support the sealing effect of the wheel cover. The shielding section of the wheel cover is designed in such a way that it shields the gap and/or the seal element arranged in the gap in at least one shielding direction. In this context, shielding means that the shielding section is arranged in such a way that direct access or access over a straight path from the external environment to the gap and/or seal element is prevented. In other words, therefore, the shielding section prevents a water jet of a high-pressure cleaner, for example, from flowing directly to the gap or to the seal element arranged in the gap and thus forms a barrier for liquids or particles moving toward the gap in a shielding direction.

If the wheel hub arrangement has a seal element according to the invention, the main body and the sealing lip preferably form a curved outer surface, which is curved concavely toward the outer region. In contrast to seals known from the prior art, the seal profile's outer surface curved concavely toward the outer region ensures that impinging liquid or dirt particles transfer their kinetic energy to the seal profile in such a way that both the main body and the sealing lip of the seal profile are pressed with a greater force against the respectively corresponding surfaces of the hub and of the wheel cover, as a result of which the sealing effect achieved by means of the seal profile is significantly increased. Conventional O-rings, for example, do not convert the kinetic energy of a water jet into static pressure but divert the water in the direction of their flanks resting on the components to be sealed, as a result of which the water can get past the seal by virtue of its remaining kinetic energy. The preferably concavely curved surface of the seal element of the present invention converts a very large proportion of the kinetic energy of a flow impinging on the seal element into static pressure, which, by virtue of the shaping of the sealing lip and the main body, presses them more strongly against the inner wall of the hub and the corresponding outer wall of the wheel cover.

In a preferred embodiment, if the wheel hub arrangement has a seal element according to the invention, the sealing lip is designed in such a way that, when there is a higher pressure in the outer region than in the inner region, the contact pressure of the sealing lip on the hub or the wheel cover is increased. Apart from the concave curvature of the outer surface of the seal profile, it is preferred that the sealing lip should project in such a way in the direction of the outer region that, if there is a higher pressure prevailing in the outer region than in the inner region, the contact pressure of the sealing lip on the hub or the wheel cover is greater than the contact pressure would be if the same pressure were to prevail in the outer region and in the inner region. In particular, this feature ensures that, even if there is no flow of liquid or dirt particles directly onto the seal profile and yet, for example, water droplets collect in the outer region on the seal profile and are forced in the direction of the inner region, e.g. by a water jet, the seal profile prevents dirt and/or liquid from getting into the inner region of the hub in an effective manner, despite this excess pressure acting from the outer region toward the inner region. Here, provision can be made for the sealing lip to have an extent along the axis of rotation which is greater than the extent of the main body of the seal profile, wherein the sealing lip has an enlarged contact surface for resting on the hub or the wheel cover, wherein the enlarged contact surface is suitable for withstanding an elevated pressure difference from the outside to the inside and thus ensures an improved sealing effect.

The seal element is furthermore preferably arranged in the preloaded state between the hub and the wheel cover, wherein the hub has a stop surface, which secures the seal profile against displacement toward the inner region. The seal element is particularly preferably manufactured from an elastically deformable material, e.g. rubber or a thermoplastic elastomer, wherein, before insertion into the region between the hub or the wheel cover, the seal element preferably has an oversize relative to this gap formed between the wheel cover and the wheel hub. The required deformation of the seal profile to enable said profile to be inserted into the gap between the hub and the wheel cover leads to a contact force of the seal element against the hub and against the wheel cover, wherein a greater sealing effect can be achieved by means of this contact force. In this case, the seal element is preferably also simultaneously pressed against the stop surface of the hub. For this purpose, one particularly preferred possibility is to provide a section on the wheel cover which presses the seal element against the stop surface of the hub, wherein the engagement section of the wheel cover is preferably configured in such a way that it can be brought into positive engagement with the hub, wherein the seal element is likewise preloaded between the wheel cover and the stop surface of the hub.

The seal element is preferably held in a receiving section of the wheel cover. To facilitate assembly, it is preferred that the seal element and the wheel cover should already be preassembled, wherein the combined structure comprising the wheel cover and the seal element can then be inserted into the recess in a hub and fixed on the hub. It is particularly preferred here if the main body of the seal element is held by positive engagement in the receiving section of the wheel cover, wherein the sealing lip is preferably deformed in such a way, as the combined structure comprising the seal element and the wheel cover is inserted into the recess in the hub, that the sealing lip is pressed with a preload against the inner surface of the recess in the hub.

As a particularly preferred option, a wheel hub arrangement is provided in which the wheel cover comprises an engagement section and a shielding section, wherein the shielding section is configured in such a way that it shields the gap between the hub and the wheel cover and/or the seal element arranged in the gap against direct impingement of fluid or dirt particles moving in a shielding direction. The combination of a wheel cover provided with a shielding section and an improved seal profile according to the present invention makes it possible to prevent the penetration of liquid or dirt particles into the inner region of the hub with the greatest possible certainty.

In a preferred embodiment, where the wheel hub arrangement has a wheel cover according to the invention with a shielding section, the shielding section is designed as an encircling projection and projects from the wheel cover substantially transversely to an axis of rotation. Normally, the hub of a commercial vehicle is of substantially rotationally symmetrical design around an axis of rotation. Of course, individual holes or projections that are not arranged in a rotationally symmetrical manner and are used to fix further elements on the hub can form deviations from this rotational geometry. Moreover, it is customary for the recess provided in the hub also to be of substantially rotationally symmetrical design, wherein the wheel cover to be inserted into the recess and covering the latter is also preferably of rotationally symmetrical design. The gap formed between the wheel cover and the hub is thus usually an annular space. It is therefore preferred that the shielding section shall be designed as an encircling projection which shields this annular gap from direct impingement of liquid or dirt particles over its entire circumference. As an advantageous possibility, the shielding section can also have different extents transversely to the axis of rotation, wherein, for example, a stepped design of the shielding section can be provided, forming a kind of labyrinth in interaction with the geometry of the inner side of the hub. In this preferred way, security against penetration of liquid and dirt into the inner region of the hub can be increased in an effective manner.

If the wheel hub arrangement has a wheel cover according to the invention with a shielding section, the shielding direction is preferably at a shielding angle of 0° to 90° to the axis of rotation. In other words, the shielding section preferably shields the gap or the seal element arranged in the gap in respect of a range of directions, wherein, starting from the axis of rotation, this range extends from an angle of the shielding direction of 0° to the axis of rotation to an angle of 90° to the axis of rotation. If the shielding angle is 0° to the axis of rotation, the shielding direction correspondingly extends parallel to the axis of rotation, wherein the wheel cover is suitable for effectively preventing liquid and dirt particles that are moving toward the gap and/or the seal element parallel to the axis of rotation from impinging directly on the gap or the seal element. In this context, the shielding angle is always measured outward in a radial direction from the axis of rotation since liquid or dirt particles impinging on a gap in a direction of motion, the shielding angle of which is less than 0° to the axis of rotation, are already prevented from reaching the gap or impinging directly on a seal profile arranged in the gap by a cap region of the wheel cover.

The maximum shielding angle ($\alpha_{max}$) of the shielding direction (RA) is particularly preferably in a range from 20° to 90°, preferably 30° to 80° and particularly preferably about 35° to 70°. The maximum shielding angle is an expression of the magnitude of the angular deviation of inflowing water or dirt particles from the axis of rotation that is just sufficient to ensure that the shielding section prevents the water or dirt particles from impinging directly on the gap or a seal element arranged in the gap. It would be theoretically possible here to design the wheel cover and the shielding section thereof in such a way that the shielding section surrounds the hub in such a way, even outside the recess, that shielding is provided in an angular range of more than 90°. However, this design of the wheel cover leads to a higher weight and, under some circumstances, also to poorer aerodynamics of a vehicle wheel fitted with such a wheel cover. As part of optimization, it is furthermore appropriate to adapt the shielding section only to those shielding directions in which the entry of liquid and dirt particles is to be expected with a high degree of probability during the operation of the commercial vehicle. In this way, a good compromise can be found between a low weight of the wheel cover with few projecting parts, such as an overdimensioned shielding section, and, on the other hand, a sufficiently great shielding effect of the shielding section. It has been found here that it may be sufficient to align the shielding section in such a way that it moves incoming water and dirt particles which are from directions offset by an angle of 30° to 80° to the axis of rotation toward the gap or toward the seal element arranged in the gap. In the event that a low weight of the wheel cover and a particularly space-saving design of the wheel cover have a higher priority than high security against the entry of liquid and dirt in the gap, it may also be sufficient to design the shielding section in such a way that the maximum shielding angle covers a range of only 35° to 70° relative to the axis of rotation. As a particularly preferred option, a compromise in which the maximum shielding angle is about 45° is provided. The smaller the selected maximum shielding angle, the greater is the preference for the use of improved sealing in the gap, said sealing being configured in such a way that water and fluid which impinge upon the seal profile at an angle of greater than 45° can be prevented in a particularly effective manner from penetrating into the inner region of the hub.

It is advantageous if the curved outer surface of the seal element has a mean radius of curvature which is 0.3 to 2.5 times, preferably 0.5 to 1.5 times and particularly preferably 0.5 to 0.8 times the width of the gap. The mean radius of curvature of the curved outer surface of the seal element can be seen particularly from a sectional view of the seal element. The higher the ratio of the mean radius of curvature to the gap width, which is preferably determined in the region of the seal element, the shallower is the curvature of the outer surface. In other words, a shallower curvature of the outer surface signifies a less sharply profiled cross-sectional geometry of the seal element, which is simpler to produce and more stable by virtue of the more compact shape. Accordingly, a higher ratio is preferred if production costs for the profile are supposed to be low and an as compact as possible construction of the seal element without delicate lips is required. At a ratio of less than 0.5, the sealing lip and/or the main body has a section in which the curved outer surface extends substantially parallel to the wall of the hub or of the wheel cover. In this case, a jet impinging on the outer surface presses the corresponding parts of the seal element substantially perpendicularly against the corresponding wall of the hub or of the wheel cover, and optimum sealing is achieved. However, the more delicate design of the sealing lip and of the main body makes the seal element more sensitive than a seal element of compact design, as described above. The particularly preferred ratio of 0.5-0.8 allows a favorable compromise between a stable, compact construction of the seal element and an optimum capacity for sealing the inner region of the hub.

BRIEF DESCRIPTION OF THE DRAWINGS

Further advantages and features of the present invention will become apparent from the following description with reference to the attached figures. Individual features disclosed in the embodiments shown can also be used in different embodiments, unless this has been explicitly excluded. In the drawing.

DETAILED DESCRIPTION OF THE PREFERRED EMBODIMENTS

Figure 1:
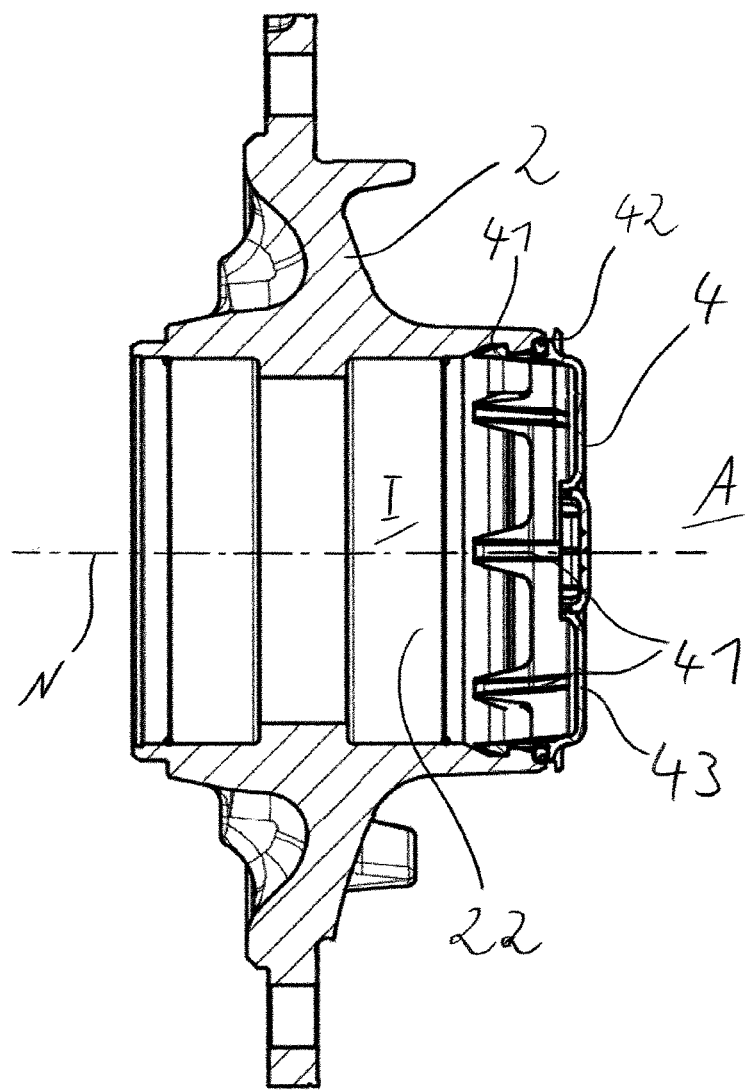
FIG. 1 shows a wheel hub arrangement having a hub and a wheel cover.

FIG. 1 shows a preferred embodiment of a wheel hub arrangement according to the invention, wherein a hub 2 has a recess 22 and wherein a wheel cover 4 is arranged on the right-hand side of the hub 2 in the figure. The wheel cover 4 has an engagement section 41, which is designed to enter into positive engagement with an appropriately corresponding engagement section on the hub 2 in order to fix the wheel cover 4 on the hub 2. The wheel cover 4 preferably has a multiplicity of individual engagement sections 41 distributed uniformly over the circumference of the wheel cover 4, as illustrated in the figure. The wheel cover 4 is arranged in such a way on the hub 2 that it separates an inner region I of the hub 2 from an outer region A of the hub 2. In other words, the inner region I is preferably the space formed in the recess 22. The hub 2 and the wheel cover 4 are particularly preferably of substantially rotationally symmetrical design with respect to an axis N of rotation. In this case, the wheel cover 4 extends substantially transversely to the axis N of rotation, i.e. the majority of the extent of the wheel cover 4 is transverse to the axis N of rotation. The wheel cover 4 furthermore preferably has a cap region 43 extending principally transversely to the axis N of rotation. The wheel cover 4 furthermore has a shielding section 42, which is preferably designed as an encircling projection and extends substantially transversely to the axis N of rotation and shields a gap formed between the wheel cover 4 and the hub 2 from the inflow of liquid or dirt particles.

Figure 2:
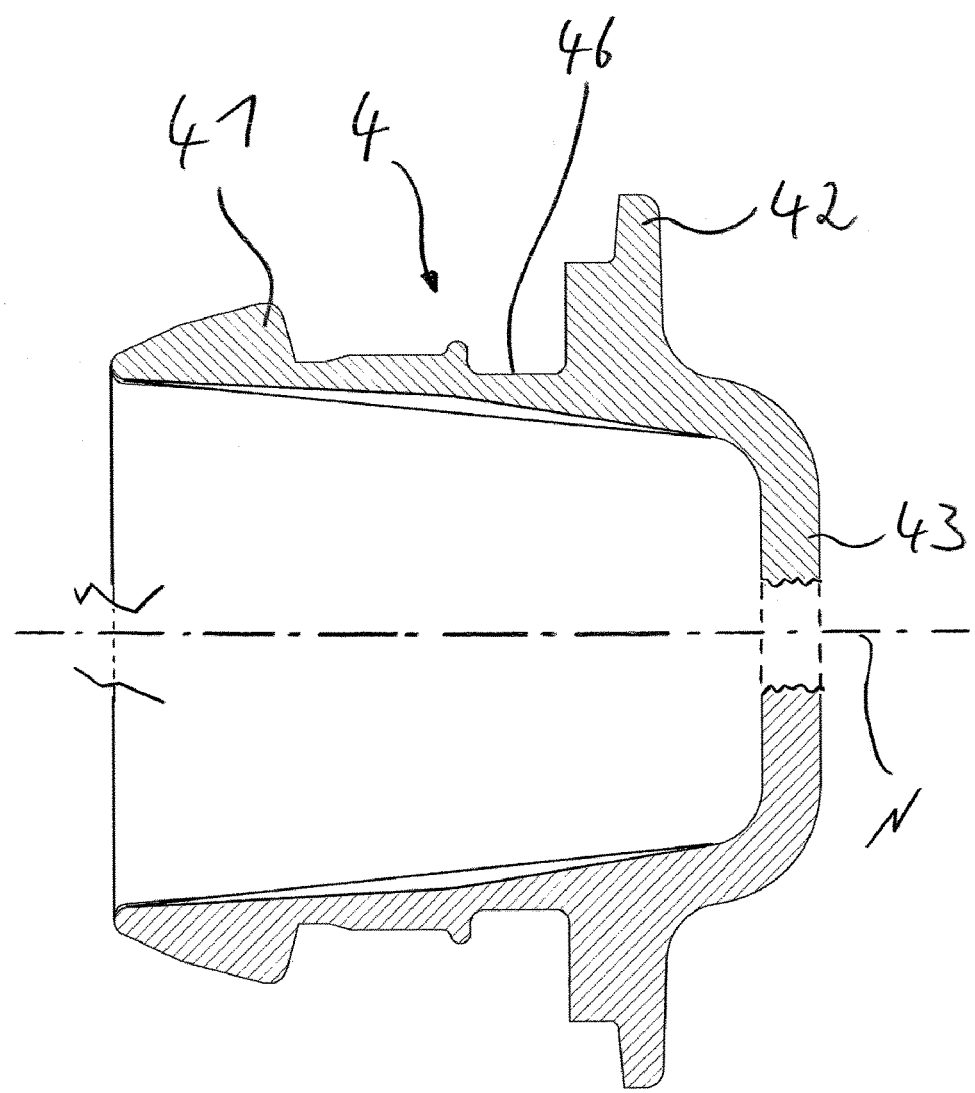
FIG. 2 shows a preferred embodiment of the wheel cover according to the invention.

FIG. 2 shows a preferred embodiment of the wheel cover 4 according to the invention. A significant element of the wheel cover 4 is the shielding section 42, which preferably extends outward on the wheel cover 4, transversely or substantially transversely to an axis N of rotation, and serves to shield a gap between the wheel cover 4 and a hub (not shown). The wheel cover 4 preferably has a receiving section 46, which is designed to receive a seal element (not shown) and to substantially secure it against displacement. The receiving section 46 advantageously secures the seal element against displacement in two directions along or parallel to the axis N of rotation. The shielding section 42, the cap region 43 and the receiving section 46 are furthermore preferably of rotationally symmetrical design around an axis N of rotation. A multiplicity of engagement sections 41 is preferably distributed at uniform intervals along a circle running around the axis N of rotation.

Figure 3:
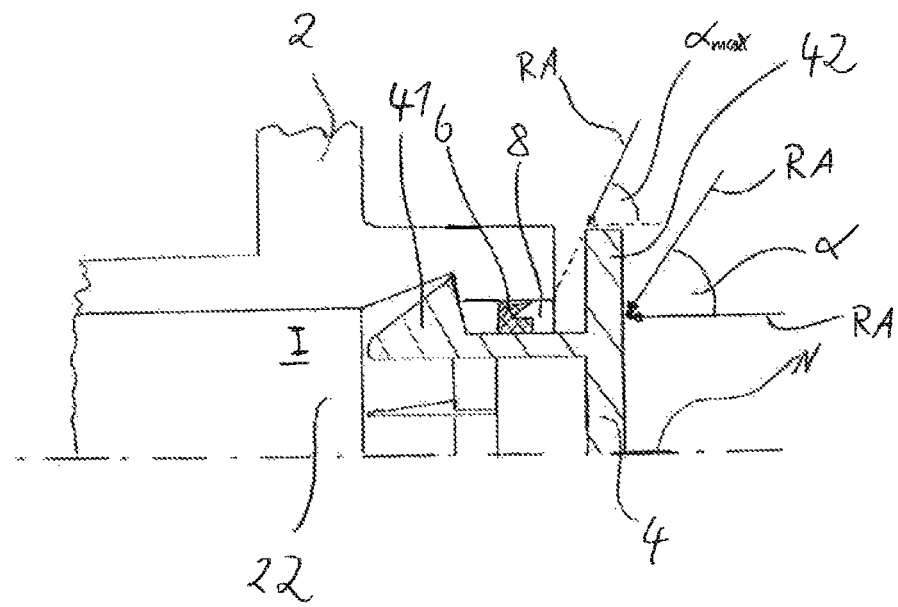
FIG. 3 shows a schematic view of a preferred embodiment of the wheel hub arrangement.

FIG. 3 shows a schematic, partially sectioned view of a preferred embodiment of the wheel hub arrangement according to the invention. This illustrates, in particular, that the shielding section 42 of the wheel cover 4 is designed to shield off a flow flowing in the direction of the gap 8 formed between the wheel cover 4 and the hub 2, thus ensuring that this fluid flow does not reach the gap 8 unhindered. It is made clear here that the shielding section 42 is suitable for preventing even those flows from reaching the gap 8 which are flowing in the direction of the interior I of the hub 2 at a shielding angle α in various shielding directions RA. Here, the angle α is measured from a line parallel to the axis N of rotation. A maximum shielding angle $α_{max}$, at which the flow moving in a shielding direction RA, having swung relative to the axis N of rotation, can still just be prevented by the shielding section 42 from reaching the gap 8 directly, is preferably defined. The maximum shielding angle $α_{max}$ of the shielding direction RA is preferably in a range from 20° to 90°, preferably 30° to 80° and particularly preferably about 35° to 70°. To increase the sealing effect of the wheel cover 4, a seal element 6 is preferably arranged between the wheel cover 4 and the hub 2.

Figure 4:
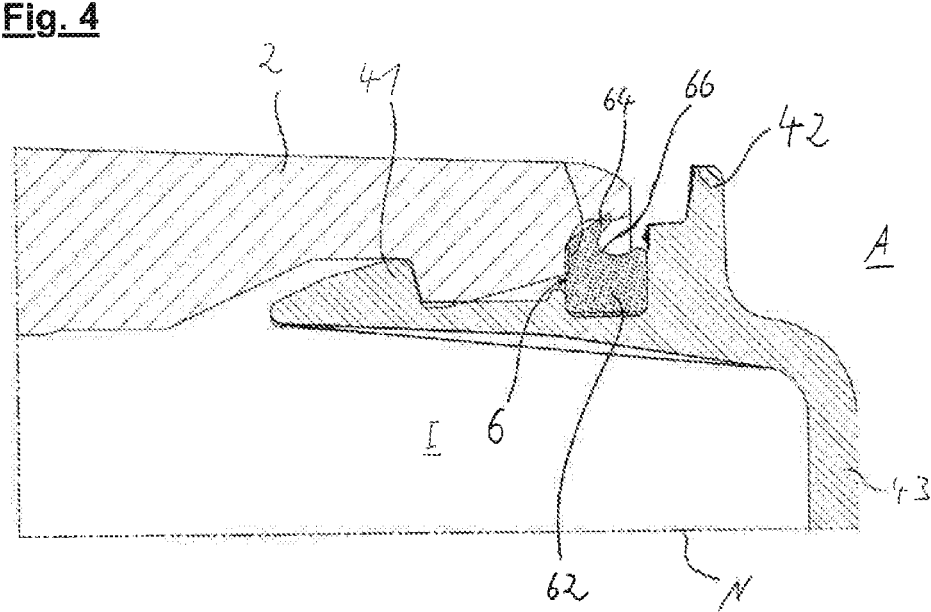
FIG. 4 shows a sectional view of a preferred embodiment of the wheel hub arrangement according to the invention.

FIG. 4 shows a sectional view of another preferred embodiment of the wheel hub arrangement according to the invention, wherein, for the sake of simplicity, only the upper part of the hub 2 and wheel cover 4, which are of rotationally symmetrical design around the axis N of rotation, is shown. The seal element 6 is preferably designed as a seal profile and has a main body 62 and a sealing lip 64. The sealing lip 64 advantageously projects in such a way from the main body 62 that it points in the direction of the outer region A. On the outer surface facing the outer region A, the sealing lip 64 and the main body 62 advantageously define a concavely curved outer surface 66. The seal element 6 shown in FIG. 4 represents the unloaded, i.e. undeformed, state of the seal element 6, wherein it can be seen that the seal element has an oversize relative to the geometry formed between the hub 2 and the wheel cover 4, which geometry is envisaged for the installation of the seal element 6. In an installed state (not shown in the figure), the seal element 6 is thus preloaded and is pressed both against the contacting surfaces of the wheel cover 4 and against the contacting surfaces of the hub 2. By means of this preload, an improved sealing effect by the seal element 6 can be achieved. In the illustrated embodiment of the wheel hub arrangement, the advantageous seal element 6, which is designed as a profile seal, is particularly preferably shielded against direct impingement of a water jet or of a flow of dirt particles by a shielding section 42 of the wheel cover 4. Such water jets can occur, for example, during high pressure cleaning of the wheels of the commercial vehicle. It is self-evident that the geometries illustrated by way of example in FIG. 3 can also be employed for the object illustrated in FIG. 4.

REFERENCE SIGNS

2—hub
4—wheel cover
6—seal element
8—gap
22—recess
24—stop surface
41—engagement section
42—shielding section
43—cover region
46—receiving section
62—main body
64—sealing lip
66—curved outer surface
α—shielding angle
A—outer region
I—inner region
N—axis of rotation
RA—shielding direction

The invention claimed is:

1. A wheel hub arrangement, comprising:
   a hub; and
   a wheel cover;
   wherein the wheel cover is configured to be fixed in a recess in the hub such that the wheel cover delimits a region external to the hub directly axially outboard of the hub with respect to an inner region of the hub;
   wherein a gap is located between the hub and the wheel cover;
   wherein a seal element is arranged in the gap, the seal element having a main body and a sealing lip;
   wherein the sealing lip projects radially outward from the main body and extends toward the region external to the hub directly axially outboard of the hub; and
   wherein the main body of the sealing element is held by positive engagement in a receiving section of the wheel cover.

2. The wheel hub arrangement as claimed in claim 1, wherein the main body and the sealing lip form a curved outer surface, which is curved concavely toward the outer region.

3. The wheel hub arrangement as claimed in claim 2, wherein the sealing lip is configured such that, when there is a higher pressure in the region external to the hub than in the inner region, the contact pressure of the sealing lip on at least one of the hub or the wheel cover is increased.

4. The wheel hub arrangement as claimed in claim 3, wherein the seal element is arranged in the preloaded state between the hub and the wheel cover, and wherein the hub has a stop surface, which secures the seal element against displacement toward the inner region.

5. The wheel hub arrangement as claimed in claim 4, wherein the wheel cover has an engagement section, which is configured to be fixed in the recess in the hub.

6. The wheel hub arrangement as claimed in claim 5, wherein the wheel cover has a shielding section, which shields the gap between the hub and the wheel cover in at least one shielding direction.

7. The wheel hub arrangement as claimed in claim 6, wherein the shielding section is configured as an encircling projection and projects from the wheel cover substantially transversely to an axis of rotation.

8. The wheel hub arrangement as claimed in claim 7, wherein the shielding direction is at a shielding angle of 0° to 90° to the axis of rotation.

9. The wheel hub arrangement as claimed in claim 8, wherein a maximum shielding angle of the shielding direction is in a range from 20° to 90°.

10. The wheel hub arrangement of claim 9, wherein the maximum shielding angle is in a range of 30° to 80°.

11. The wheel hub arrangement of claim 10, wherein the maximum shielding angle is in a range of 35° to 70°.

12. The wheel hub arrangement as claimed in claim 9, wherein the curved outer surface has a mean radius of curvature which is 0.3 to 2.5 times a width of the gap, wherein the width of the gap is the distance between a diameter of the recess and an exterior diameter of the wheel cover proximate the seal element.

13. The wheel hub arrangement of claim 12, wherein the mean radius of curvature is 0.5 to 1.5 times the width of the gap.

14. The wheel hub arrangement of claim 13, wherein the mean radius of curvature is 0.5 to 0.8 times the width of the gap.

15. The wheel hub arrangement as claimed in claim 1, wherein the sealing lip is configured such that, when there is a higher pressure in the region external to the hub than in the inner region, the contact pressure of the sealing lip on at least one of the hub or the wheel cover is increased.

16. The wheel hub arrangement as claimed in claim 1, wherein the seal element is arranged in the preloaded state between the hub and the wheel cover, and wherein the hub has a stop surface, which secures the seal element against displacement toward the inner region.

17. The wheel hub arrangement as claimed in claim 1, wherein the wheel cover has an engagement section, which is configured to be fixed in the recess in the hub.

18. The wheel hub arrangement as claimed in claim 1, wherein the wheel cover has a shielding section, which shields the gap between the hub and the wheel cover in at least one shielding direction.

19. The wheel hub arrangement as claimed in claim 18, wherein the shielding section is configured as an encircling projection and projects from the wheel cover substantially transversely to an axis of rotation.

20. The wheel hub arrangement as claimed in claim 18, wherein the shielding direction is at a shielding angle of 0° to 90° to the axis of rotation.

21. The wheel hub arrangement as claimed in claim 18, wherein a maximum shielding angle of the shielding direction is in a range from 20° to 90°.

22. The wheel hub arrangement as claimed in claim 1, wherein the main body and the sealing lip form a curved outer surface which is curved concavely toward the region external to the hub, and wherein the curved outer surface has a mean radius of curvature which is 0.3 to 2.5 times a width of the gap, wherein the width of the gap is the distance between a diameter of the recess and an exterior diameter of the wheel cover proximate the seal element.

* * * * *